United States Patent Office 3,708,593
Patented Jan. 2, 1973

3,708,593
USE OF L-PROLYL L-LEUCYL GLYCINE AMIDE AS AN ANTI-DEPRESSANT
Nicholas Peter Plotnikoff, Lake Bluff, Ill., assignor to Abbott Laboratories, Chicago, Ill.
No Drawing. Filed Aug. 24, 1971, Ser. No. 174,548
Int. Cl. A61k 27/00
U.S. Cl. 424—274                            4 Claims

ABSTRACT OF THE DISCLOSURE

Covers a method of treating patients exhibiting symptoms of depression by administering to said patient L-prolyl L-leucyl glycine amide.

BACKGROUND OF THE INVENTION

Patients suffering from depression manifest one or more of a variety of symptoms. Generally speaking, a depressed patient feels incapable of dealing with his responsibilities. The predominate symptoms of depression are hypochondria, anoxeria, insomnia, anergia, anhedonia and pessimism. Patients suffering from these symptoms are usually treated with anti-depressants. The present invention provides a method for treating patients exhibiting these symptoms of depression.

BRIEF SUMMARY OF THE INVENTION

This invention relates to a method of treating patients exhibiting symptoms of depression. More particularly, it relates to a method of administering to said patients at least an effective dosage of L-prolyl L-leucyl glycine amide.

DETAILED DESCRIPTION OF THE INVENTION

In more detail L-prolyl L-leucyl glycine amide has recently been synthesized and the tripeptide structure is now known and is now as follows:

$$\begin{array}{c} CH_2\text{---}CH_2 \quad O \\ | \quad\quad\quad | \quad\quad || \\ CH_2 \quad CH\text{---}C\text{---}N\text{---}CH\text{---}C\text{---}N\text{---}CH_2\text{---}CO\text{---}NH_2 \\ \diagdown \quad \diagup \quad\quad\quad | \quad\quad | \\ NH \quad\quad\quad H \quad CH_2 \\ \quad\quad\quad\quad\quad\quad\quad | \\ \quad\quad\quad\quad\quad\quad\quad CH \\ \quad\quad\quad\quad\quad\quad \diagup \diagdown \\ \quad\quad\quad\quad\quad CH_3 \quad CH_3 \end{array}$$

(See, for example, Celis et al. Biophysical Soc. Abstr. TPM–K 12, 98a, 1971.)

For convenience sake, this amide will hereinafter be referred to as tripeptide.

The tripeptide can be administered orally or by injection. For the latter, solutions or suspensions may be prepared by slurrying 1–10% of tripeptide in water containing 0.1–2% of carboxymethylcellulose. Suspensions may also be prepared by using 0.05–0% tragacanth solutions. For oral administration, tablets, pills or capsules are easily prepared. Tablets may be prepared to contain between 5 and 25 mg. of the active ingredient together with the usual tableting adjuvants, e.g., coloring agents, flavoring agents, diluents, lubricants, carriers, and, if desired, dispersing agents or relief retardants. The tripeptide may also be combined with other active compounds such as tranquilizers.

The tripeptide anti-depressant when administered to mammals such as humans is effective in a dosage range from about 0.1 to about 100 mg./kg. of body weight daily, either in single or divided dosages. More often the daily dosage range is 1–25 mgs./kg.

EXAMPLE I

One excellent way of testing the tripeptide for its antidepressant activity is via the modified Dopa test described by G. M. Everett et al. Proc. 1st Int. Sym. Anti-depressant Drug, p. 164 (1966).

The above-modified Dopa test is based on the following: When DL-Dopa is given to untreated mice no response occurs because of the inactivation of the Dopa by endogenous monoamine oxidase. However, if mice are pre-treated with an oxidase inhibitor such as an oral administration of 40 mg./kg. of pargyline hydrochloride, and then given 200 mg./kg. of DL-Dopa orally, along with a known anti-depressant drug, the mice show maximum motor reaction, violent activity, jumping and fighting.

Known anti-depressants such as imipramine and amitryptyline are extremely effective agents in potentiating the Dopa response in mice. Thus, the modified Dopa test has been found to be usually sensitive and reliable in evaluating the anti-depressant activity of potential drugs.

Here various dosages of tripeptides were administered and effectiveness rated after various periods of time. The tripeptide was administered by intraperitoneal injection. A rating of 1 indicates slight activity; a rating of 2 indicates moderate activity; and a rating of 3 indicates marked activity.

Results are given in Table I below.

TABLE I

| Dosage | Rating after— | | | |
|---|---|---|---|---|
| | 1 hr. | 4 hrs. | 8 hrs. | 24 hrs. |
| 0.1 mg./kg | 3 | | | |
| 0.2 mg./kg | 3 | | | |
| 0.4 mg./kg | 3 | | | |
| 0.5 mg./kg | 3 | 2 | 2 | 1 |
| 1 mg./kg | 3 | 2 | 2 | 2 |
| 2 mg./kg | 3 | 3 | 2 | 2 |
| 4 mg./kg | 3 | 3 | 2 | 2 |
| 8 mg./kg | 1 | 3 | 2 | 2 |
| 16 mg./kg | 1 | 3 | 3 | 3 |

Thus, it can be seen that the response in the Dopa test for the tripeptide as tested showed that it had excellent activity as an anti-depressant drug.

What is claimed is:
1. A method of treating a patient exhibiting symptoms of depression comprising the step of administering to said patient at least an effective dosage of L-prolyl L-leucyl glycine amide.
2. The method of claim 1 where said dosage range is from about 0.1 to about 100 mg./kg. of body weight daily.
3. The method of claim 2 where said dosage range is 1–25 mg./kg.
4. The method of claim 1 where said composition is administered in a unit dosage form in a pharmaceutically-acceptable carrier, said carrier comprising a major portion of said dosage form.

References Cited

R. Celis et al.: Proc. Nat. Acad. Sci., U.S.A., vol. 68, No. 7, pp. 1428–1433 (1971).

STANLEY J. FRIEDMAN, Primary Examiner